US009104299B2

(12) United States Patent  (10) Patent No.: US 9,104,299 B2
Li et al.  (45) Date of Patent: Aug. 11, 2015

(54) METHOD AND CORRESPONDING APPARATUS FOR DISPLAYING ARC MENU INDEX

(71) Applicant: Huawei Technologies Co., Ltd., Shenzhen, Guangdong (CN)

(72) Inventors: Rui Li, Nanjing (CN); Yong Liu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 13/713,162

(22) Filed: Dec. 13, 2012

(65) Prior Publication Data

US 2013/0174092 A1 Jul. 4, 2013

(30) Foreign Application Priority Data

Dec. 28, 2011 (CN) .......................... 2011 1 0447640

(51) Int. Cl.
  *G06F 3/0484* (2013.01)
  *G06F 3/0482* (2013.01)
  *G06F 3/0488* (2013.01)

(52) U.S. Cl.
  CPC .......... *G06F 3/04847* (2013.01); *G06F 3/0482* (2013.01); *G06F 3/04886* (2013.01)

(58) Field of Classification Search
  CPC . G06F 3/0482; G06F 3/0483; G06F 3/04886; G06F 3/04808; G06F 3/04883; G06F 3/04804; G06F 3/04807; G06F 3/0485
  USPC .......................................................... 715/834
  See application file for complete search history.

(56) References Cited

U.S. PATENT DOCUMENTS

| | | | |
|---|---|---|---|
| 5,617,114 A * | 4/1997 | Bier et al. ...................... | 345/634 |
| 2004/0212617 A1* | 10/2004 | Fitzmaurice et al. ......... | 345/440 |
| 2008/0126981 A1* | 5/2008 | Candrian et al. ............. | 715/810 |
| 2008/0174570 A1* | 7/2008 | Jobs et al. ..................... | 345/173 |
| 2008/0222571 A1* | 9/2008 | Yoshioka ...................... | 715/841 |

(Continued)

FOREIGN PATENT DOCUMENTS

| | | |
|---|---|---|
| CN | 101853123 A | 10/2010 |
| CN | 102118514 A | 7/2011 |
| CN | 102203715 A | 9/2011 |

(Continued)

OTHER PUBLICATIONS

Partial translation of International Search Report dated Oct. 25, 2012 in connection with International Patent Application No. PCT/CN2012/073542.

(Continued)

*Primary Examiner* — Claudia Dragoescu

(57) ABSTRACT

Embodiments of the present invention disclose a method and a corresponding apparatus for displaying an arc menu index, which are used to display index characters on an arc display bar. The method according to an embodiment of the present invention includes: receiving a menu expanding instruction; and expanding an arc menu index on a display according to the menu expanding instruction, where the arc menu index includes an index operation area, an index pointer, and index characters; the index operation area is an area encompassed by an arc border line displayed on the display and a display frame intersecting the arc border line, the index characters are arranged along the arc border line, and the index pointer is located in the index operation area and is configured to indicate a selected index character.

13 Claims, 4 Drawing Sheets

(56) References Cited

U.S. PATENT DOCUMENTS

| | | |
|---|---|---|
| 2010/0241985 A1 | 9/2010 | Kim et al. |
| 2010/0251181 A1 | 9/2010 | Lal |
| 2010/0306702 A1 | 12/2010 | Warner |
| 2012/0075194 A1* | 3/2012 | Ferren .......................... 345/168 |
| 2013/0002565 A1* | 1/2013 | Tumanov et al. ............. 345/173 |
| 2013/0027335 A1 | 1/2013 | Li et al. |

FOREIGN PATENT DOCUMENTS

| | | |
|---|---|---|
| CN | 102281352 A | 12/2011 |
| WO | WO 2010/138360 A1 | 12/2010 |

OTHER PUBLICATIONS

Partial translation of Office Action dated May 6, 2013 in connection with Chinese Patent Application No. 201110447640.3.

* cited by examiner

METHOD AND CORRESPONDING APPARATUS FOR DISPLAYING ARC MENU INDEX

CROSS-REFERENCE TO RELATED APPLICATIONS

This application claims priority to Chinese Patent Application No. 201110447640.3, filed on Dec. 28, 2011, which is hereby incorporated by reference in its entirety.

TECHNICAL FIELD

Embodiments of the present invention relate to the man-machine interaction field, and in particular, to a method and a corresponding apparatus for displaying an arc menu index.

BACKGROUND

In an existing mobile terminal, a search menu is generally distributed vertically or horizontally with bar items. Such a menu distribution mode is intuitive and clear, but when being applied to a touch-screen mobile terminal, it may bring inconvenience to a user.

When using a touch-screen mobile terminal, a user generally performs the operation with one hand. When dragging or switching a search menu, a thumb needs to perform a vertical or horizontal operation, which does not satisfy a requirement of human engineering. The thumb cannot flexibly move and easily clicks a non-target character, which causes a mal-operation.

SUMMARY

Embodiments of the present invention provide a method and a corresponding apparatus for displaying an arc menu index, which are used to display index characters on an arc display bar.

A method for displaying an arc menu index provided in the present invention includes: receiving a menu expanding instruction; and expanding an arc menu index on a display according to the menu expanding instruction, where the arc menu index includes an index operation area, an index pointer, and index characters, the index operation area is an area encompassed by an arc border line displayed on the display and display edges intersecting the arc border line, the index characters are arranged along the arc border line, and the index pointer is located in the index operation area and is configured to indicate a selected index character.

Optionally, the method further includes:
acquiring a first specified position clicked on the display by a user, where the first specified position is used to determine a radius of the arc border line; the expanding the arc menu index on the display according to the menu expanding instruction includes: expanding the arc menu index with the radius determined by the first specified position on the display according to the menu expanding instruction.

Optionally, the expanding the arc menu index with the radius determined by the first specified position on the display according to the menu expanding instruction: acquiring preset N circle centers, where N is an integer greater than 1; generating N arc border lines with the N circle centers and the radius determined by the first indication position for the user to select; and expanding the arc menu index on the display according to an arc border line selected by the user.

Optionally, the generating N arc border lines according to the radius determined by the first indication position and the N circle centers includes: generating N radiuses according to the first indication position and the N circle centers, where the N radiuses are distances from the first indication position to the N circle centers respectively; and generating N arc border lines with the N circle centers and the N radiuses, where the arc border lines are arcs generated on the display with the circle centers and radiuses that correspond to the circle centers.

Optionally, the arc border line is an arc generated on the display by using the vertex of the lower left corner or lower right corner of the display as a circle center, where a radius of the arc is smaller than the width of the display.

Optionally, after the receiving the menu expanding instruction sent by the user, the method further includes:
detecting a thumb-index finger web position of a palm of the user, where the thumb-index finger web position is used to determine a circle center of the arc border line.

Optionally, if the arc border line is an arc generated on the display by using the vertex of the lower left corner or lower right corner of the display as the circle center, the method further includes: acquiring a second specified position clicked in the index operation area by the user; and triggering an operation corresponding to an index character which a connection line between the circle center and the second specified position and an extension line of the connection line passes through.

Optionally, the triggering the operation corresponding to the index character which the connection line between the circle center and the second specified position and the extension line of the connection line passes through includes: highlighting the index character which the connection line between the circle center and the second specified position and the extension line of the connection line passes through.

Optionally, highlighting the index character which the connection line area between the circle center and the second specified position passes through includes: highlighting the index character which the connection line area between the circle center and the second specified position passes through in a pop-up manner, an enlargement manner, or a color change manner.

An apparatus for displaying an arc menu index provided in the present invention includes:
an instruction receiving unit, configured to receive a menu expanding instruction; and a menu displaying unit, configured to expand an arc menu index on a display according to the menu expanding instruction, where the arc menu index includes an index operation area, an index pointer, and index characters, the index operation area is an area encompassed by an arc border line displayed on the display and display edges intersecting the arc border line, the index characters are arranged along the arc border line, and the index pointer is located in the index operation area and is configured to indicate a selected index character.

Optionally, the apparatus for displaying an arc menu index further includes:
a detecting unit, configured to detect a thumb-index finger web position of a palm of a user after the menu expanding instruction sent by the user is received, where the thumb-index finger web position is used to determine a circle center of the arc border line; and the menu displaying unit is further configured to expand the arc menu index on the display according to the menu expanding instruction and the thumb-index finger web position, where the arc border line of the arc menu index is an arc that is drawn on the display by using the thumb-index finger web position as a circle center.

Optionally, the apparatus for displaying an arc menu index further includes:

a first acquiring unit, configured to acquire a first specified position clicked on the display by the user, where the first specified position is used to determine a radius of the arc border line; and the menu displaying unit is further configured to expand the arc menu index with the radius determined by the first specified position on the display according to the menu expanding instruction.

Optionally, the menu displaying unit includes:

a circle center acquiring module, configured to acquire preset N circle centers, where N is an integer greater than 1; an arc generating module, configured to generate N arc border lines with the N circle centers and the radius determined by the first indication position for the user to select; and a menu expanding module, configured to expand the arc menu index on the display according to an arc border line selected by the user.

Optionally, the apparatus for displaying an arc menu index further includes:

a second acquiring unit, configured to acquire a second specified position clicked in the index operation area by the user, and trigger an operation corresponding to an index character which a connection line between the circle center and the second specified position and an extension line of the connection line passes through; and a highlighting unit, configured to highlight, after the second specified position is acquired, the index character which the connection line between the circle center and the second specified position and the extension line of the connection line passes through.

It can be seen from the foregoing technical solutions that, the embodiments of the present invention have the following advantages: The arc menu index in the present invention includes the index operation area and the index characters, where the index operation area is an area encompassed by the arc border line and the display frame inside the arc border line, and the index characters are arranged along the inside of the arc border line. As a thumb of a person moves by using the thumb-index finger web position of the palm as a circle center and the length of the thumb as a radius, the arc operation area accords with human engineering of fingers and better facilitates a user operation, thereby improving positioning accuracy of the user operation.

DETAILED DESCRIPTION

Embodiments of the present invention provide a method and a corresponding apparatus for displaying an arc menu index, which are used to display index characters on an arc display bar.

Figure 1:
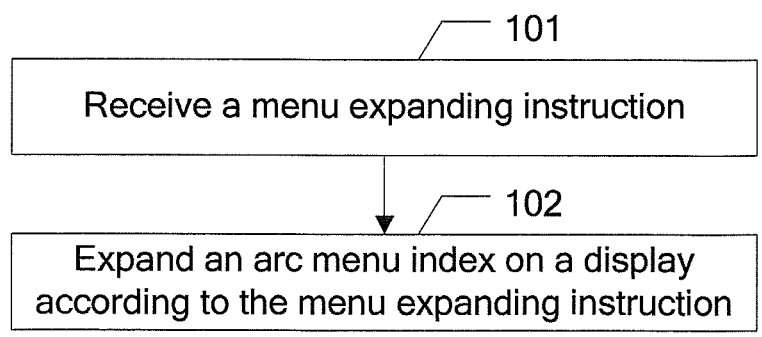
FIG. 1 is a schematic flow chart of a method for displaying an arc menu index according to an embodiment of the present invention.

Referring to FIG. 1, an embodiment of a method for displaying an arc menu index according to an embodiment of the present invention includes:

101. Receive a menu expanding instruction.

After a user clicks a start button of an arc menu index, an apparatus for displaying an arc menu index may receive a menu expanding instruction.

This embodiment of the present invention is applied to a mobile terminal that supports a touch-screen operation. Specifically, the start button of the arc menu index may be set at the lower right corner position of the display of the mobile terminal. Optionally, according to the difference of operating habits between user's left hand and the right hand, the position of the start button of the arc menu index may be selected by the user. For example, if the user is used to holding the mobile terminal with the left hand, the start button of the arc menu index may be set at the lower left corner position of the display of the mobile terminal.

102. Expand the arc menu index on the display according to the menu expanding instruction.

The apparatus for displaying an arc menu index expands the arc menu index on the display according to the menu expanding instruction.

Figure 2:
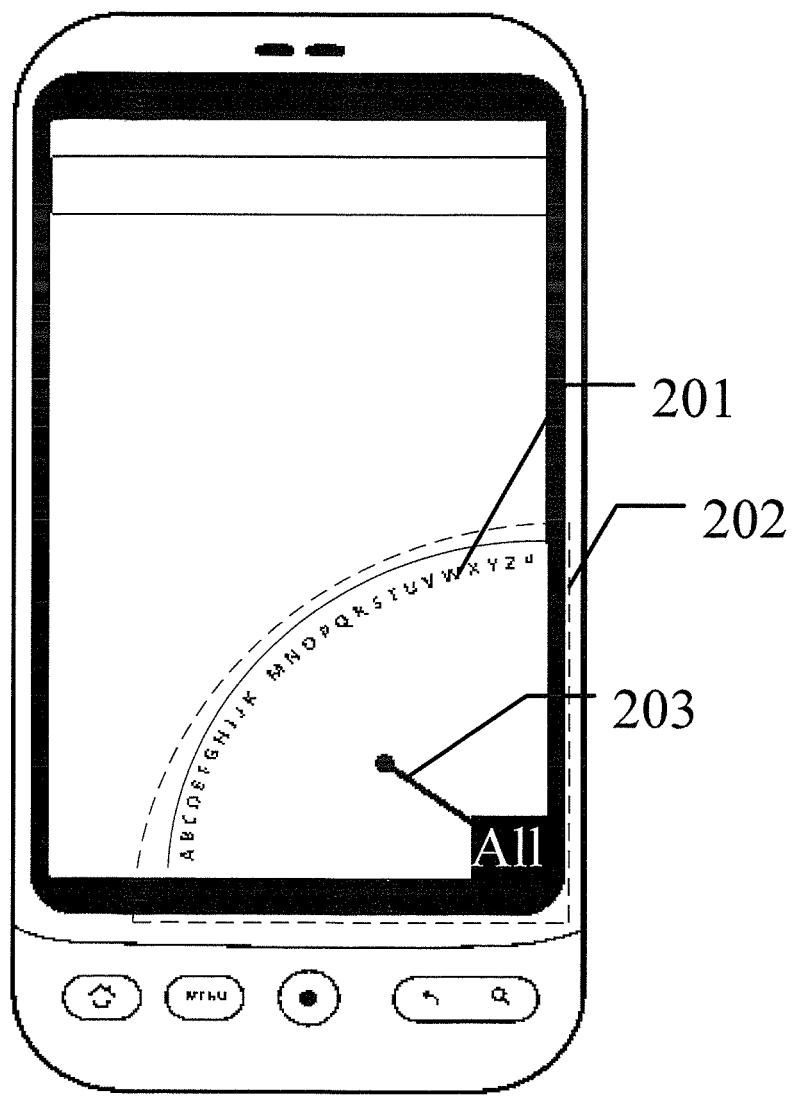
FIG. 2 is a schematic diagram of a display of an arc menu index according to an embodiment of the present invention.

Specifically, referring to FIG. 2, the expanded arc menu index includes index characters 201, an index pointer 202, and index characters 203. The index pointer is located in the index operation area and is configured to indicate a selected index character. Optionally, the index pointer may point to an index character by using the lower left corner or lower right corner of the display as a starting point.

The index operation area is an area that is compassed by an arc border line displayed on the display and display edges intersecting the arc border line, and the index characters are arranged along the arc border line. Optionally, the index characters may be arranged along the inside of the arc border line and may also be arranged along the outside of the arc border line.

In the embodiment of the present invention, the index characters arranged along an operation arc may be Chinese characters or English letters. Specifically, the characters may be arranged according to the sequence of 26 English letters (Chinese characters may be arranged according to the first Pinyin letters of the characters.)

Optionally, the arc border line of the index operation area may be an arc that is drawn on the display with a circle center selected from any point outside the display as a circle center; the arc border line may also be an arc that is drawn on the display with a circle center selected from the vertex of the lower left corner or lower right corner, and a radius of the arc smaller than the width of the display; and the arc border line may also be an arc that is drawn on the display with any preset position as a circle center.

Optionally, if the vertex of the lower left corner or lower right corner of the display serves as the circle center, the index operation area is a sectoral area. Specifically, the size of the sectoral area (determined by the radius of the arc) may be a fixed value (that is, the radius of the arc is fixed), and may also be specified by the user, that is, when opening the arc menu index of the present invention, the user may determine the radius of the arc by clicking any point on the display (for example, using the distance between the point clicked by the user and the vertex of the lower left corner or lower right corner as the radius). If the maximum radius is set to be smaller than the width of the display for the arc menu index, when the user clicks a point beyond the maximum radius on the display, the arc operation area with the maximum radius is selected by default.

Figure 3:
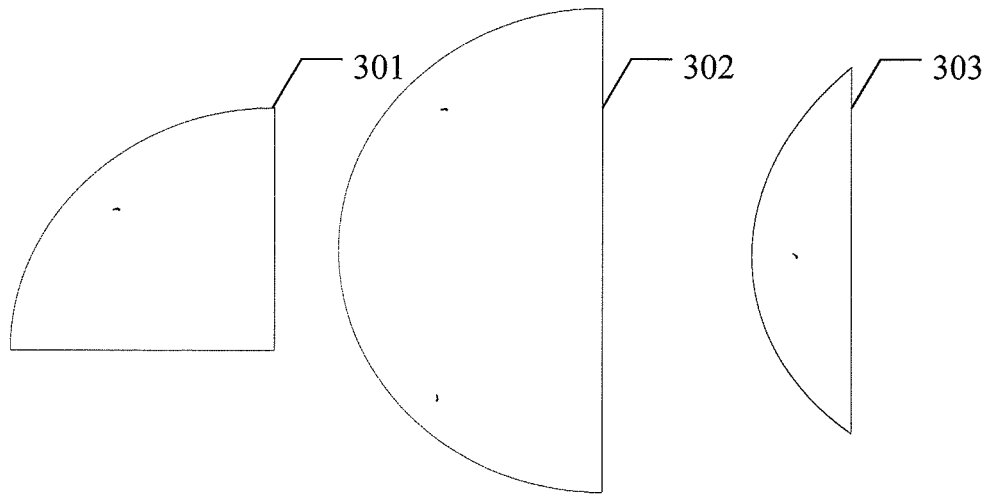
FIG. 3 is a schematic diagram of a display form of an arc menu index according to an embodiment of the present invention.

As shown in FIG. 3, in the implementation process, according to different manners for determining the circle center, the index operation area may be the sectoral area shown by 301 in the figure, the semi-circle area shown by 302 in the figure, or the arc area shown by 303 in the figure.

The arc menu index of the present invention includes the index operation area and the index characters, where the index operation area is an area compassed by the arc border line and the display edges inside the arc border line, and the index characters are arranged along the inside of the arc border line. As a thumb of a person moves around the thumb-index finger web position of the palm, a circle center, with a radius equal to the length of the thumb, the arc operation area accords with human engineering of fingers and better facilitates a user operation, thereby improving positioning accuracy of the user operation.

Figure 4:
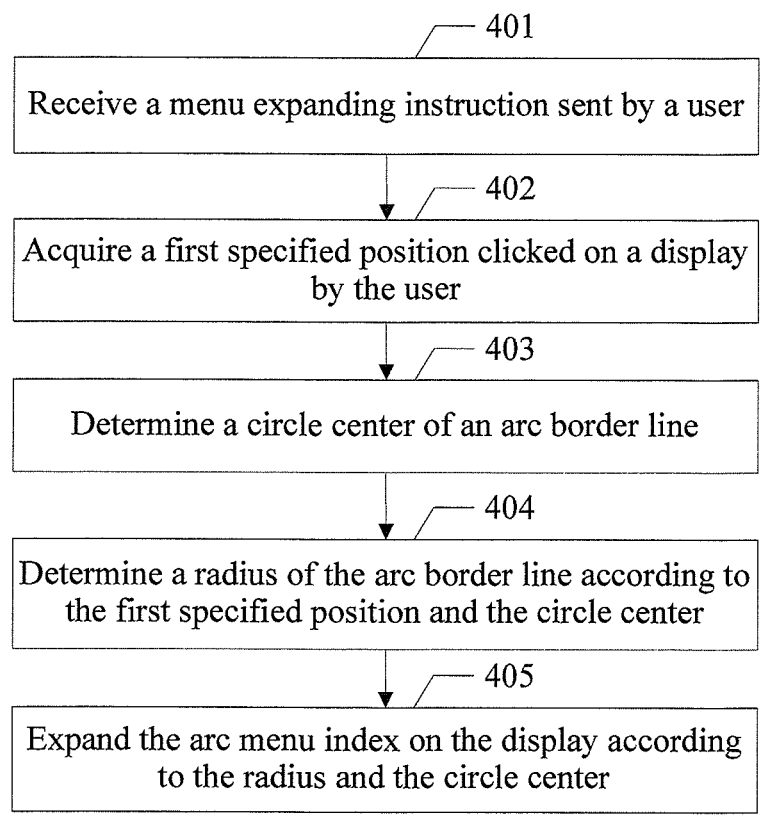
FIG. 4 is another schematic flow chart of a method for displaying an arc menu index according to an embodiment of the present invention.

To adapt to sizes of thumbs of different users, an embodiment of the present invention further provides a method for setting a size of an index operation area. Referring to FIG. 4, another embodiment of a method for displaying an arc menu index according to an embodiment of the present invention includes:

401. Receive a menu expanding instruction sent by a user.

After the user clicks the start button of an arc menu index, an apparatus for displaying an arc menu index may receive the menu expanding instruction sent by the user.

402. Acquire a first specified position clicked on the display by the user.

After the apparatus for displaying an arc menu index receives the menu expanding instruction sent by the user, the apparatus for displaying an arc menu index displays on the display an interface for setting a radius of an arc border line. The user may click any position on the display. After the user performs a clicking operation, the apparatus for displaying an arc menu index may acquire the first specified position clicked on the display by the user.

403. Determine a circle center of the arc border line.

The apparatus for displaying an arc menu index determines the circle center of the arc border line. Optionally, the circle center may be determined by using the following methods:

1. The apparatus for displaying an arc menu index acquires preset N circle centers, where N is an integer greater than 1, and the user may select one from the N circle centers as the circle center of the arc border line according to personal habits or preference;

2. Use the vertex of the lower left corner or lower right corner of the display as the circle center of the arc border line, where the user may select whether to specifically use the vertex of the lower left corner or that of the lower right corner; and 3. Use the thumb-index finger web position of a palm of the user as the circle center of the arc border line. A method for determining the thumb-index finger web position is described in the subsequent embodiment.

404. Determine the radius of the arc border line according to the first specified position and the circle center.

The apparatus for displaying an arc menu index determines the radius of the arc border line according to the first specified position and the circle center. Specifically, the distance between the first indication position and the circle center may be used as the radius.

405. Expand the arc menu index on the display according to the radius and the circle center.

After the apparatus for displaying an arc menu index determines the radius and circle center of the arc border line, the arc menu index is generated on the display with the radius and the circle center.

Specifically, in actual applications, a circle may be determined by a specified circle center and a specified radius. An intersected area between the circle and the display may be used as an index operation area of the arc menu index. After the apparatus for displaying an arc menu index determines the index operation area, index characters and an index pointer are generated in the index operation area, where the index characters may be arranged along the arc border line, and the index pointer may point to an index character by using the lower left corner or lower right corner of the display as a starting point.

Optionally, if the solution of N circle centers is used, after the apparatus for displaying an arc menu index acquires the first indication position, N arc border lines may be directly generated according to the first indication position and the N circle centers for the user to select. After an arc border line selected by the user is acquired, the arc menu index is expanded on the display according to the arc border line selected by the user. Specifically, the apparatus for displaying an arc menu index may generate N radiuses according to the first indication position and the N circle centers, and then generates N arc border lines according to the N circle centers and the N radiuses, where the N radiuses are distances between the first indication position and the N circle centers respectively, and the arc border lines are arcs generated on the display according to the circle centers and radiuses that correspond to the circle centers.

The apparatus for displaying an arc menu index determines the radius of the arc border line according to the first specified position. As such, the user may determine the size of the index operation area according to an operating habit of the user, thereby improving user experience in the operating process.

Figure 5:
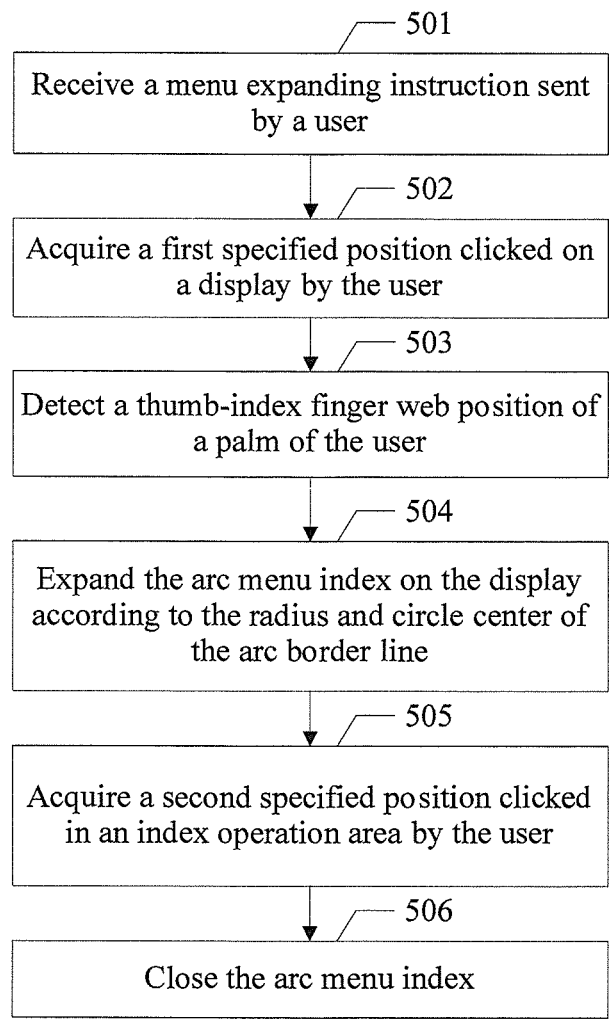
FIG. 5 is another schematic flow chart of a method for displaying an arc menu index according to an embodiment of the present invention.

If the mobile terminal in this embodiment of the present invention is equipped with a gravity-sensing apparatus, the apparatus for displaying an arc menu index may use the gravity-sensing apparatus to determine the circle center of the arc border line. Referring to FIG. 5, another embodiment of a method for displaying an arc menu index according to an embodiment of the present invention includes:

501. Receive a menu expanding instruction sent by a user.

After the user clicks the start button of an arc menu index, an apparatus for displaying an arc menu index may receive the menu expanding instruction sent by the user.

502. Acquire a first specified position clicked on the display by the user.

After the apparatus for displaying an arc menu index receives the menu expanding instruction sent by the user, the apparatus for displaying an arc menu index displays on the display an interface for setting a radius of an arc border line. The user may click any position on the display. After the user performs a clicking operation, the apparatus for displaying an arc menu index may acquire the first specified position clicked on the display by the user.

Optionally, if the apparatus for displaying an arc menu index is preset with a radius of the arc border line, step 502 may not be performed.

503. Detect a thumb-index finger web position of a palm of the user.

After the apparatus for displaying an arc menu index receives the menu expanding instruction sent by the user, the apparatus for displaying an arc menu index detects the thumb-index finger web position of a palm of the user by using the gravity-sensing apparatus, and uses the thumb-index finger web position as a circle center of the arc border line.

In actual applications, as a certain inclination exists when the user holds the mobile terminal and the inclination has a certain position relationship with the thumb-index finger web position of the palm of the user, the position relationship between the inclination and the thumb-index finger web position of the palm of the user may be set by using a preset algorithm. After receiving the menu expanding instruction sent by the user, the apparatus for displaying an arc menu index detects the inclination by using the gravity-sensing apparatus, and calculates the thumb-index finger web position of the palm of the user according to the inclination and the preset algorithm.

Optionally, if the user presets the radius of the arc border line, after it is determined that the thumb-index finger web position is used as the circle center of the arc border line, step 504 may be directly triggered. If the apparatus for displaying an arc menu index acquires the first specified position, the apparatus for displaying an arc menu index first determines the radius of the arc border line according to the distance between the specified position and the circle center.

504. Expand the arc menu index on the display according to the radius and circle center of the arc border line.

The apparatus for displaying an arc menu index expands the arc menu index on the display according to the radius and circle center of the arc border line.

Specifically, the apparatus for displaying an arc menu index determines that the arc border line is an arc that is drawn on the display by using the thumb-index finger web position as the circle center. An area that is compassed by the drawn arc and the display frame inside the arc border line is used as an index operation area. Index characters are arranged along the arc border line and an index pointer points to an index character.

In actual applications, the gravity-sensing apparatus may sense that the applied force inclines towards the hand of the user grasping the mobile terminal. In this case, the thumb-index finger web position of the palm of the user may be approximately measured by using some pre-configured parameters, and the mobile terminal may draw an arc on the display by using the thumb-index finger web position as the circle center. Likewise, as described in the foregoing embodiment, the radius of the arc may be specified by the user. Therefore, the index operation area that is finally constructed according to the length of the radius specified by the user and the position of the circle center sensed by the gravity-sensing apparatus may be a sectoral area, a semi-circle area, or an arc area. In this manner, once the user operates the mobile terminal with the screen being horizontal, the arc menu index in this embodiment of the present invention may adjust the position and angle of the arc menu on the display by using the gravity-sensing apparatus so that user experience is further improved.

Optionally, if a single-layer character display bar cannot completely arrange index characters that need to be displayed, for example, 26 English letters, a second-layer character display bar is set inside index characters that are arranged along the first layer, and the remaining index characters that need to be displayed may be arranged on the second-layer character display bar. If the second-layer character display bar still cannot completely display, a third-layer character display bar, a fourth-layer character display bar, and so on may be set according to an actual situation. Alternatively, when the single-layer character display bar cannot completely arrange the index characters that need to be displayed, the character display bar in this embodiment of the present invention may further support a sliding operation, that is, when a finger of the user slides along a certain direction of the arc border line in the index operation area, positions of the index characters may be switched in turn along the direction, that is, the index characters may also slide along the direction.

In this manner, an index character that is not currently displayed may be switched to by sliding.

The foregoing merely uses some examples to illustrate application scenarios in this embodiment of the present invention. It should be understood that, in actual applications, more application scenarios may exist and are not specifically limited herein.

505. Acquire a second specified position clicked in the index operation area by the user.

The user clicks a target index character in the index operation area. In this case, the apparatus for displaying an arc menu index may acquire the second specified position clicked by the user, and the apparatus for displaying an arc menu index triggers an operation corresponding to the index character. For example, if an a search is for looking up a contact, when a certain character is clicked, a contact corresponding to this character is displayed. If the clicked index character is "A", the mobile terminal displays, in the form of a pop-up pane, a contact with a contact name whose first Pinyin letter is "A".

Optionally, the user is able not only to directly click an index character on the character display bar but also to perform clicking on the index operation area beyond the character display bar to trigger an operation corresponding to the target index character, which specifically is:

The apparatus for displaying an arc menu index may acquire the second specified position clicked in the index operation area by the user. If the second specified position is not a position where an index character is located, the apparatus for displaying an arc menu index may trigger an operation corresponding to an index character which a connection line area between the circle center and the second specified position passes through. For example, if the index operation area is a sectoral area that uses the vertex of the lower left corner of the display as the circle center, the user may click a ray that uses the circle center as a starting point and points to an index character in the index operation area to trigger an operation corresponding to the index character which the ray points to. Further, to enable the user to clearly see an index character that needs to be clicked, after the second specified position is determined, the index character which the ray points to is highlighted. Optionally, the highlighting manner includes a pop-up manner, an enlargement manner, or a color change manner. When a finger of the user slides along a certain direction of the arc border line in the index operation area, positions of the index characters may be switched in turn along the direction, that is, the index characters may also slide along the direction so that the user may find a required index character.

506. Close the arc menu index.

The user may click the close button of the arc menu index. In this case, the apparatus for displaying an arc menu index receives an instruction of closing the arc menu index, and closes the arc menu index according to the instruction.

Specifically, the close button and the start button of the arc menu index may be a same button, one time of clicking on which indicates starting and another time of clicking on which indicates closing.

Optionally, when the mobile terminal detects that no user operation is performed on the index operation area in a preset period of time, the mobile terminal may automatically close the arc menu index.

The foregoing merely uses some examples to describe application scenarios in this embodiment of the present invention. It should be understood that, in actual applications, more application scenarios may exist and are not specifically limited herein.

Figure 6:
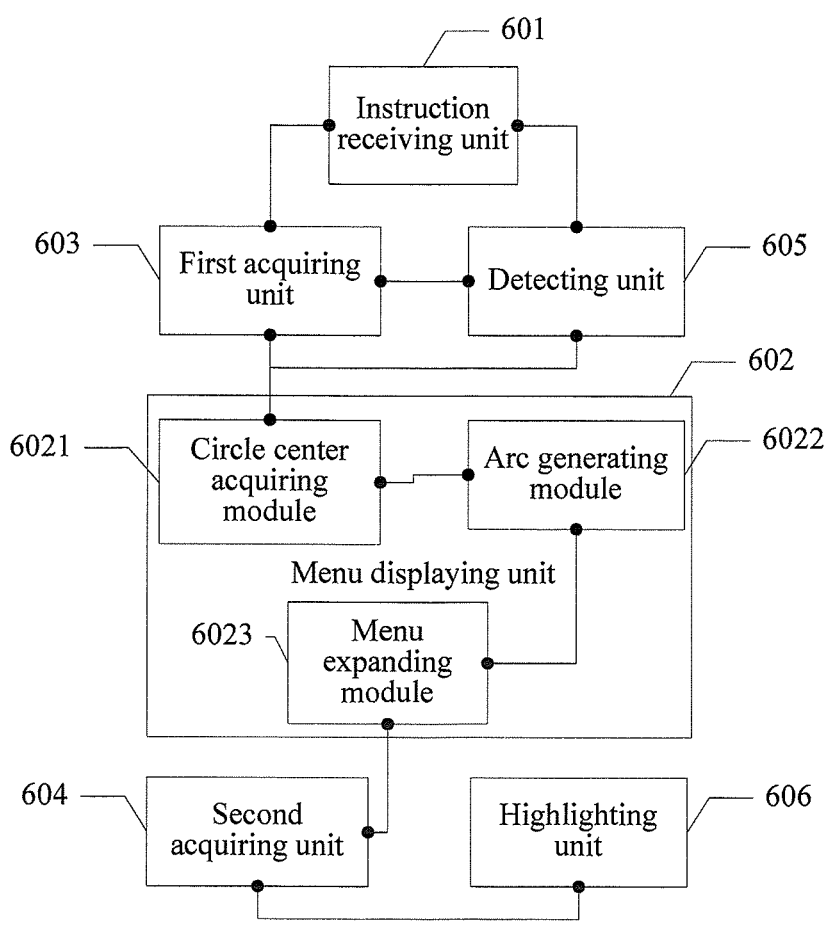
FIG. 6 is a schematic diagram of a logical structure of an apparatus for displaying an arc menu index according to an embodiment of the present invention.

An embodiment of an apparatus for displaying an arc menu index and performing the method for displaying an arc menu index in the present invention is illustrated below. For a logical structure of the apparatus, reference may be made to FIG. 6. The embodiment of the apparatus for displaying an arc menu index according to this embodiment of the present invention includes:

an instruction receiving unit 601, configured to receive a menu expanding instruction; and a menu displaying unit 602, configured to expand an arc menu index on a display according to the menu expanding instruction, where the arc menu index includes: an index operation area, an index pointer, and index characters, the index operation area is an area that is compassed by an arc border line displayed on the display and a display frame intersecting the arc border line, the index characters are arranged along the arc border line, and the index pointer is located in the index operation area and is configured to indicate a selected index character.

The apparatus for displaying an arc menu index according to this embodiment of the present invention may further include:

a first acquiring unit 603, configured to acquire a first specified position clicked on the display by a user, where the first specified position is used to determine a radius of the arc border line, where accordingly, the menu displaying unit 602 is further configured to expand the arc menu index with the radius determined by the first specified position on the display according to the menu expanding instruction;

a second acquiring unit 604, configured to acquire a second specified position clicked in the index operation area by the user, and trigger an operation corresponding to an index character which a connection line between the circle center and the second specified position and an extension line of the connection line pass through;

a detecting unit 605, configured to detect the thumb-index finger web position of a palm of the user after the menu expanding instruction sent by the user is received, where the thumb-index finger web position is used to determine a circle center of the arc border line, where accordingly, the menu displaying unit 602 is further configured to expand the arc menu index on the display according to the menu expanding instruction and the thumb-index finger web position, where the arc border line of the arc menu index is an arc that is drawn on the display with the thumb-index finger web position as the circle center; and a highlighting unit 606, configured to highlight, after the second specified position is acquired, the index character which the connection line between the circle center and the second specified position and the extension line of the connection line pass through.

Optionally, the menu displaying unit 602 in this embodiment of the present invention may include:

a circle center acquiring module 6021, configured to acquire preset N circle centers, where N is an integer greater than 1;

an arc generating module 6022, configured to generate N arc border lines with the N circle centers and the radius determined by the first indication position for the user to select; and a menu expanding module 6023, configured to expand the arc menu index on the display according to an arc border line selected by the user.

A specific operation process of each unit of the apparatus for displaying an arc menu index in this embodiment of the present invention is as follows:

After the user clicks the start button of the arc menu index, the instruction receiving unit 601 receives the menu expanding instruction. This embodiment of the present invention is applied to a mobile terminal that supports a touch-screen operation. Specifically, the start button of the arc menu index may be set at the lower right corner position of the display of the mobile terminal. Optionally, according to different operating habits between the left hand and the right hand of the user, the position of the start button of the arc menu index may be selected by the user. For example, if the user has a habit of holding the mobile terminal with the left hand, the start button of the arc menu index may be set at the lower left corner position of the display of the mobile terminal.

Optionally, if the mobile terminal in this embodiment of the present invention is equipped with a gravity-sensing apparatus, after the menu expanding instruction sent by the user is received, the detecting unit 605 detects the thumb-index finger web position of the palm of the user by using the gravity-sensing apparatus, and uses the thumb-index finger web position as the circle center of the arc border line.

In actual applications, as a certain inclination exists when the user holds the mobile terminal and the inclination has a certain position relationship with the thumb-index finger web position of the palm of the user, the position relationship between the inclination and the thumb-index finger web position of the palm of the user may be set by using a preset algorithm. After the user receives the menu expanding instruction sent by the user, the apparatus for displaying an arc menu index detects the inclination by using the gravity-sensing apparatus, and calculates the thumb-index finger web position of the palm of the user according to the inclination and the preset algorithm.

Optionally, the circle center may also be determined by using the following methods:

1. The apparatus for displaying an arc menu index acquires preset N circle centers, where N is an integer greater than 1, and the user may select one from the N circle centers as the circle center of the arc border line according to personal habits or preference; and 2. Use the vertex of the lower left corner or lower right corner of the display as the circle center of the arc border line, where the user may select whether to specifically use the vertex of the lower left corner or that of the lower right corner.

After the circle center is determined, a radius may be determined according to the circle center. Optionally, if the user needs to determine the size of the index operation area in this embodiment, after the menu expanding instruction sent by the user is received, an interface for setting the radius of the arc border line is displayed on the display. The user may click any position on the display. After the user performs a clicking operation, the first acquiring unit 603 may acquire the first specified position clicked on the display by the user.

After the first specified position is acquired, the menu displaying unit 602 determines the radius of the arc border line according to the first specified position and the circle center (specifically, the distance between the first indication position and the circle center may be used as the radius) and generates the arc menu index with the radius and the circle center on the display.

Specifically, in actual applications, a circle may be determined after the circle center and the radius are determined. An intersected area between the circle and the display may be used as an index operation area of the arc menu index. After the apparatus for displaying an arc menu index determines the index operation area, index characters and an index pointer are generated in the index operation area, where the index characters may be arranged along the arc border line, and the index pointer may point to an index character by using the lower left corner or lower right corner of the display as a starting point.

Optionally, if the solution of N circle centers is used, the circle center acquiring module 6024 of the menu displaying unit 602 may acquire the preset N circle centers; the arc generating module 6022 generates N arc border lines according to the radius determined by the first indication position and the N circle centers for the user to select; and the menu expanding module 6023 expands the arc menu index on the display according to an arc border line selected by the user. Specifically, the apparatus for displaying an arc menu index may generate N radiuses according to the first indication position and the N circle centers, and then generates N arc border lines according to the N circle centers and the N radiuses, where the N radiuses are distances between the first indication position and the N circle centers respectively, and the arc border lines are arcs generated on the display according to the circle centers and radiuses that correspond to the circle centers.

After the searching menu is expanded, if the user performs a clicking operation in the searching menu, the second acquiring unit 604 may acquire the second specified position clicked in the index operation area by the user and trigger an operation corresponding to an index character which a ray using the circle center as a starting point and passing through the second specified position points to. For example, if an application of the searching is searching for a contact, when a certain character is clicked, a contact corresponding to the character is displayed. If the clicked index character is "A", the mobile terminal displays, in the form of a pop-up pane, a contact with a contact name whose first Pinyin letter is "A".

Optionally, the user is able not only to directly click an index character on a character display bar but also to perform clicking on the index operation area beyond the character display bar to trigger an operation corresponding to a target index character, which specifically is:

The apparatus for displaying an arc menu index may acquire the second specified position clicked in the index operation area by the user. If the second specified position is not a position where an index character is located, the apparatus for displaying an arc menu index may trigger an operation corresponding to an index character that a connection line area between the circle center and the second specified position passes through. For example, if the index operation area is a sectoral area that uses the vertex of the lower left corner of the display as the circle center, the user may click a ray that uses the circle center as a starting point and points to an index character in the index operation area to trigger an operation corresponding to the index character which the ray points to. Further, to enable the user to clearly see an index character that needs to be clicked, after the second specified position is determined, the highlighting unit 606 highlights the index character which the ray points to. Optionally, the highlighting manners include the manners such as a pop-up manner, an enlargement manner, or a color change manner. When a finger of the user slides along a certain direction of the arc border line in the index operation area, positions of the index characters may be switched in turn along the direction, that is, the index characters may also slide along the direction so that the user may find a required index character.

In several embodiments provided in this application, it should be understood that, the disclosed apparatuses and methods may be implemented through other manners. For example, the apparatus embodiments described in the foregoing are merely exemplary, for example, the division of the units is merely logical function division and may be other division in actual implementation. For example, multiple units or components may be combined or integrated into another system or some features may be ignored or may not be performed. In addition, the shown or discussed coupling or direct coupling, or communicative connections may be accomplished through some interfaces, and indirect coupling or communication connection between apparatuses, or units may be electrical, mechanical, or in other forms.

Units described as separate components may be or may not be physically separated. Components shown as units may be or may not be physical units, that is, the component may be either located at a place or distributed on multiple network units. A part of or all of the units may be selected to achieve the objectives of the solutions of the embodiments according to actual demands.

In addition, various functional units in each embodiment of the present invention may be integrated in one processing unit, or may exist as various separate physical units, or two or more than two units may be integrated into one unit. The integrated unit may be not only implemented through hardware, but also implemented in a form of hardware plus a software functional module.

When being implemented in the form of a software functional unit and being sold or used as an independent product, the integrated unit may be stored in a computer readable storage medium. Based on such understanding, the technical solutions of the present invention may be essentially, or the part that make contributions to the prior art or all or a part of the technical solutions may be embodied in the form of a software product. The computer software product may be stored in a storage medium, including several instructions used to enable a computer device (for example, a personal computer, a server, or a network device) to implement all or a part of steps of the method in each embodiment of the present invention. The storage medium includes any medium that is capable of storing program codes, for example, a U disk, a portable hard disk, a read-only memory (ROM, Read-Only Memory), a random access memory (RAM, Random Access Memory), a magnetic disk, or an optical disk.

The foregoing describes only specific embodiments of the present invention, but the protection scope of the present invention is not limited thereto. Any modification or substitution readily conceivable by persons skilled in the art within the scope of the technology disclosed in the present invention shall fall within the protection scope of the present invention. Therefore, the protection scope of the present invention should be subject to the appended claims.

What is claimed is:

1. A computer-implemented method for displaying an arc menu index, the method comprising:
   at a computing device with a display screen:
      receiving a menu expanding instruction;
      detecting an inclination of the computing device using a gravity-sensing device;
      detecting a thumb-index finger web position of a palm of a user based on the detected inclination of the computing device;
      determining a circle center of an arc border line based on the detected thumb-index finger web position;
      displaying the arc border line on the display screen; and
      expanding an arc menu index on the display screen according to the circle center of the arc border line and the menu expanding instruction; wherein
         the arc menu index comprises: an index operation area, an index pointer, and index characters;
         the index operation area is an area encompassed by the arc border line displayed on the display screen and display edges intersecting the arc border line, and the index characters are arranged along the arc border line; and
         the index pointer is located in the index operation area and is configured to indicate a selected index character.

2. The computer-implemented method according to claim 1, wherein the method further comprises:
  acquiring a first position clicked on the display screen by a user, wherein the first position is used to determine a radius of the arc border line; and
  wherein expanding the arc menu index on the display according to the menu expanding instruction comprises:
    expanding the arc menu index with the radius determined by the first position on the display according to the menu expanding instruction.

3. The computer-implemented method according to claim 2, wherein expanding the arc menu index with the radius determined by the first position on the display according to the menu expanding instruction comprises:
  acquiring N circle centers, wherein N is an integer greater than 1;
  generating N arc border lines with the N circle centers and the radius determined by the first position for the user to select; and
  expanding the arc menu index on the display screen according to an arc border line selected by the user.

4. The computer-implemented method according to claim 3, wherein generating N arc border lines with the N circle centers and the radius determined by the first position comprises:
  generating N radiuses according to the first position and the N circle centers, wherein the N radiuses are distances from the first position to the N circle centers respectively; and
  generating N arc border lines with the N circle centers and the N radiuses, wherein the arc border lines are arcs generated on the display screen with the circle centers and radiuses that correspond to the circle centers.

5. The computer-implemented method according to claim 1, wherein the arc border line is an arc generated on the display screen by using a vertex of a lower left corner or lower right corner of the display screen as a circle center, wherein a radius of the arc is smaller than a width of the display screen.

6. The computer-implemented method according to claim 5, wherein if the arc border line is an arc generated on the display screen by using the vertex of the lower left corner or lower right corner of the display screen as the circle center, the method further comprises:
  acquiring a second position clicked in the index operation area by the user; and
  triggering an operation corresponding to an index character which a connection line between the circle center and the second position and an extension line of the connection line passes through.

7. The computer-implemented method according to claim 6, wherein triggering the operation corresponding to the index character which the connection line between the circle center and the second position and the extension line of the connection line pass through comprises:
  highlighting the index character which the connection line between the circle center and the second position and the extension line of the connection line passes through.

8. The computer-implemented method according to claim 7, wherein highlighting the index character which the connection line area between the circle center and the second position passes through comprises:
  highlighting the index character which the connection line area between the circle center and the second position passes through in a pop-up manner, an enlargement manner, or a color change manner.

9. An apparatus for displaying an arc menu index, the apparatus comprising:
  an instruction receiving unit, configured to receive a menu expanding instruction;
  a detecting unit, configured to detect an inclination of the apparatus using a gravity-sensing device and to detect a thumb-index finger web position of a palm of a user based on the detected inclination of the apparatus; and
  a menu displaying unit, configured to determine a circle center of an arc border line based on the detected thumb-index finger web position, display the arc border line on the display screen, and expand an arc menu index on a display according to the circle center of the arc border line and the menu expanding instruction, wherein the arc menu index comprises: an index operation area, an index pointer, and index characters; the index operation area is an area encompassed by an arc border line displayed on the display and display edges intersecting the arc border line, the index characters are arranged along the arc border line, and the index pointer is located in the index operation area and is configured to indicate a selected index character.

10. The apparatus for displaying an arc menu index according to claim 9, wherein the thumb-index finger web position is used to determine a circle center of the arc border line; and
  the menu displaying unit is further configured to expand the arc menu index on the display according to the menu expanding instruction and the thumb-index finger web position, wherein the arc border line of the arc menu index is an arc drawn on the display with the thumb-index finger web position as the circle center.

11. The apparatus for displaying an arc menu index according to claim 9, further comprising:
  a first acquiring unit, configured to acquire a first position clicked on the display by a user, wherein the first position is used to determine a radius of the arc border line; and
  the menu displaying unit is further configured to expand the arc menu index with the radius determined by the first position on the display according to the menu expanding instruction.

12. The apparatus for displaying an arc menu index according to claim 11, wherein the menu displaying unit comprises:
  a circle center acquiring module, configured to acquire N circle centers, wherein N is an integer greater than 1;
  an arc generating module, configured to generate N arc border lines with the radius determined by the first position and the N circle centers for the user to select; and
  a menu expanding module, configured to expand the arc menu index on the display according to an arc border line selected by the user.

13. The apparatus for displaying an arc menu index according to claim 9, further comprising:
  a second acquiring unit, configured to acquire a second position clicked in the index operation area by a user; and trigger an operation corresponding to an index character which a connection line between the circle center and the second specified position and an extension line of the connection line passes through; and
  a highlighting unit, configured to highlight, after the second position is acquired, the index character which the connection line between the circle center and the second specified position and the extension line of the connection line passes through.

* * * * *